(12) United States Patent
Liu et al.

(10) Patent No.: US 8,574,670 B2
(45) Date of Patent: Nov. 5, 2013

(54) METHOD FOR MEMBRANE DEPOSITION

(75) Inventors: Wei Liu, Painted Post, NY (US); Curtis Robert Fekety, Tioga, PA (US); Todd P St Clair, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 69 days.

(21) Appl. No.: 13/185,848

(22) Filed: Jul. 19, 2011

(65) Prior Publication Data

US 2011/0274835 A1 Nov. 10, 2011

Related U.S. Application Data

(62) Division of application No. 11/729,732, filed on Mar. 29, 2007, now Pat. No. 8,006,637.

(51) Int. Cl.
*B05D 7/22* (2006.01)

(52) U.S. Cl.
CPC .................................... *B05D 7/22* (2013.01)
USPC ............ 427/230; 427/235; 427/238; 427/294

(58) Field of Classification Search
CPC ........................................................ B05D 7/22
USPC .................................. 427/230, 235, 238, 294
See application file for complete search history.

(56) References Cited

U.S. PATENT DOCUMENTS

| | | | | |
|---|---|---|---|---|
| 3,948,213 A | * | 4/1976 | Hoyer et al. | ..................... 118/50 |
| 3,959,520 A | * | 5/1976 | Hoyer et al. | ........................ 427/8 |
| 4,038,939 A | * | 8/1977 | Hoyer et al. | .................. 118/665 |
| 4,039,482 A | * | 8/1977 | Hoyer et al. | .................. 502/332 |
| 4,066,801 A | * | 1/1978 | Hoyer et al. | ........................ 427/8 |
| 4,191,126 A | * | 3/1980 | Reed et al. | ..................... 118/50 |
| 4,208,454 A | * | 6/1980 | Reed et al. | ..................... 427/238 |
| 4,550,034 A | * | 10/1985 | Shimrock et al. | ............. 427/243 |
| 4,609,563 A | * | 9/1986 | Shimrock et al. | ................. 427/8 |
| 5,165,970 A | * | 11/1992 | Schmidt et al. | ............ 427/430.1 |

(Continued)

FOREIGN PATENT DOCUMENTS

| | | |
|---|---|---|
| EP | 0428990 A1 | 11/1990 |
| EP | 0980710 B1 | 2/2002 |
| GB | 2385008 A | 8/2003 |
| JP | 60-255999 | 12/1985 |

OTHER PUBLICATIONS

Shigeo Hoshino; "NP Series, Rigid Surface—How to Make and Evaluate"; Maki Shoten Publishing; Sep. 30, 1998; First Edition; pp. 133, 140-144.

(Continued)

*Primary Examiner* — William Phillip Fletcher, III
(74) *Attorney, Agent, or Firm* — Robert P. Santandrea

(57) ABSTRACT

A method and apparatus for applying a uniform membrane coating to a substrate, such as a honeycomb structure, having a plurality of through-channels, wherein the through-channels have an average diameter of less than or equal to 3 mm. The method includes providing a liquid precursor comprising membrane-forming materials to the substrate and applying a pressure differential across the substrate. The pressure differential causes the liquid precursor to travel uniformly through the through-channels, depositing the membrane-forming materials on the walls of the through-channels and forming the membrane on the walls of the through-channels. The apparatus includes a chamber capable of holding the substrate and of maintaining a pressure differential across the plurality of through-channels.

8 Claims, 9 Drawing Sheets

(56) References Cited

U.S. PATENT DOCUMENTS

| | | | |
|---|---|---|---|
| 5,182,140 A * | 1/1993 | Watanabe et al. | 427/230 |
| 5,422,138 A * | 6/1995 | Watanabe et al. | 427/230 |
| 5,866,210 A * | 2/1999 | Rosynsky et al. | 427/294 |
| 5,953,832 A * | 9/1999 | Rosynsky et al. | 34/403 |
| 6,149,973 A * | 11/2000 | Foerster et al. | 427/235 |
| 6,478,874 B1 * | 11/2002 | Rosynsky et al. | 118/63 |
| 6,548,105 B2 * | 4/2003 | Kiessling et al. | 427/8 |
| 6,599,570 B1 * | 7/2003 | Aderhold et al. | 427/238 |
| 6,599,857 B2 * | 7/2003 | Taniguchi et al. | 502/300 |
| 6,627,257 B1 * | 9/2003 | Foerster et al. | 427/235 |
| 6,656,871 B2 * | 12/2003 | Taniguchi et al. | 502/300 |
| 6,746,716 B2 * | 6/2004 | Kiessling et al. | 427/230 |
| 7,147,892 B2 * | 12/2006 | Aderhold et al. | 427/238 |
| 7,374,792 B2 * | 5/2008 | Rosynsky et al. | 427/231 |
| 7,476,417 B2 * | 1/2009 | Dettling et al. | 427/238 |
| 7,521,087 B2 * | 4/2009 | Rosynsky et al. | 427/231 |
| 7,678,416 B2 * | 3/2010 | Suzuki et al. | 427/230 |
| 8,006,637 B2 * | 8/2011 | Liu et al. | 118/408 |
| 8,302,557 B2 * | 11/2012 | Goshima et al. | 118/410 |
| 2004/0001919 A1 * | 1/2004 | Aderhold et al. | 427/294 |
| 2006/0091742 A1 | 5/2006 | Wang | |
| 2007/0128354 A1 * | 6/2007 | Suzuki et al. | 427/238 |
| 2008/0200328 A1 * | 8/2008 | Eberle et al. | 502/100 |

OTHER PUBLICATIONS

Japanese Patent Office; First Office Abtion; Issue Date: Feb. 26, 2013; pp. 1-5.

* cited by examiner a b
(prior art)

c
(prior art)

a b a b

METHOD FOR MEMBRANE DEPOSITION

The present application is a divisional of U.S. Pat. No. 8,006,637, filed on Mar. 29, 2007, entitled "METHOD AND APPARATUS FOR MEMBRANE DEPOSITION," the contents of which are relied upon and incorporated herein by reference in their entirety.

BACKGROUND OF INVENTION

The invention relates to the deposition of coatings in channels. More particularly, the invention relates to the deposition of membrane coatings in honeycomb channels having small diameters. Even more particularly, the invention relates to a method and apparatus for depositing membrane coatings in honeycomb channels having small diameters.

A variety of coating methods, including dip-coating, slip casting, and spin coating have been used to deposit layers of materials—particularly membrane materials—on porous substrates or support structures. Such methods work well for coating flat surfaces, external surfaces of tubular structures, or internal surfaces of large diameter tubes.

However, the application of membrane coatings to multiple small sized (≤3 mm diameter) channels in a monolithic substrate or support presents challenges that are difficult to overcome using the previously mentioned methods. Such challenges include the introduction of viscous coating solutions into small channels, providing uniform coatings along the length and around the circumference of the channels, and controlling deposition conditions, such as residence time. In addition, the above methods are not effective in coating such channels using reactive processes, such as electroless plating, hydrothermal synthesis, and the like.

Whereas wash coating has been used to deposit catalyst layers on honeycomb substrates having small channels and high densities, this process is not applicable to the membrane coating process for several reasons. First, wash coating typically results in a coating layer having a number of cracks and a thickness that is greater than that desired for membrane films. Secondly, the length of the honeycomb structure that can be coated by wash coating is limited to about 6 inches (about 15 cm).

Presently available coating techniques are unable to provide uniform membrane coatings for small channels of honeycomb structures of longer length. Therefore, what is needed is a method of applying a uniform membrane coating to the channels of such honeycomb structures. What is also needed is an apparatus that enables the application of such membrane coatings to honeycomb structures having small channels.

SUMMARY OF INVENTION

The present invention meets these and other needs by providing a method and apparatus for applying a uniform membrane coating to a substrate, such as a honeycomb structure, having a plurality of through-channels. The method includes providing a liquid precursor comprising membrane-forming materials to the substrate and applying a pressure differential across the substrate. The pressure differential causes the liquid precursor to travel uniformly through the through-channels, depositing the membrane-forming materials on the walls of the through-channels and forming the membrane on the walls of the through-channels. The apparatus includes an inlet that uniformly distributes a liquid precursor to the honeycomb structure of the substrate, a chamber capable of holding the substrate and maintaining a pressure differential across the plurality of through-channels, and an outlet.

Accordingly, one aspect of the invention is to provide an apparatus for depositing a membrane. The apparatus comprises: a liquid precursor source adapted to contain a liquid precursor; a chamber; and a pressurization system coupled to the chamber. The chamber comprises: a midsection adapted to support a substrate having a first end, a second end, and a plurality of through-channels extending through the substrate from the first end to the second end; an inlet section adjacent to the midsection in contact with the first end of the substrate, wherein the inlet is in fluid communication with the liquid precursor source and the first end of the substrate, and wherein the inlet section is capable of providing a uniform distribution of the liquid precursor to the first end of the substrate; and an outlet section adjacent to and in fluid communication with the second end of the substrate, wherein the outlet section is capable of providing a uniform discharge of a fluid from the second end of the substrate resulting in removal of the fluid from the chamber. The pressurization system provides a pressure differential between the first end and the second end of the substrate through the plurality of through-channels.

A second aspect of the invention is to provide a chamber for depositing a membrane. The chamber comprises: a midsection adapted to support a substrate having a first end, a second end, and a plurality of through-channels extending through the substrate from the first end to the second end; an inlet section adjacent to the midsection in contact with the first end of the substrate, wherein the inlet section is in fluid communication with the first end of the substrate, and wherein the inlet section is capable of providing a uniform distribution of a liquid precursor to the first end of the substrate; and an outlet section adjacent to and in fluid communication with the second end of the substrate, wherein the outlet is capable of providing a uniform discharge of fluid from the second end of the substrate resulting in removal of the fluid from the chamber; and wherein the chamber is capable of maintaining a pressure differential between the first end and the second end through the plurality of through-channels.

A third aspect of the invention is to provide an apparatus for depositing a membrane, the apparatus comprising: a liquid precursor source adapted to contain a liquid precursor; a vertically oriented chamber; and a pressurization system coupled to the chamber. The chamber comprises: a midsection adapted to support a substrate having a first end, a second end, and a plurality of through-channels extending through the substrate from the first end to the second end; an inlet section located at the bottom of the chamber and below the midsection, wherein the inlet section is in contact with the first end of the substrate and in fluid communication with the liquid precursor source and the first end of the substrate, and wherein the inlet section is capable of providing a uniform distribution of the liquid precursor to the first end of the substrate; an outlet section located at the top of the chamber and above the midsection, and wherein the outlet section is in fluid communication with the second end of the substrate, wherein the outlet section is capable of providing uniform discharge of a fluid from the second end of the substrate resulting in removal of the fluid from the chamber. The pressurization system provides a pressure differential between the first end and the second end through the plurality of through-channels.

Another aspect of the invention is to provide a method of forming a membrane in a plurality of through-channels disposed in a substrate. The method comprises the steps of: providing the substrate to a chamber, the substrate having a first end, a second end, and a plurality of through-channels extending through the substrate from the first end to the second end, wherein the chamber has an inlet section, a midsection, and an outlet section, wherein the substrate is disposed in the midsection such that the first end is adjacent to and in fluid communication with the inlet section and the second end is adjacent to and in fluid communication with the outlet section; providing a liquid precursor to the inlet section, wherein the liquid precursor comprises membrane-forming materials; providing a pressure differential between the inlet section and the outlet section, wherein the pressure differential causes the liquid precursor to flow uniformly through the plurality of through-channels; and forming the membrane on a surface of the plurality of through-channels.

These and other aspects, advantages, and salient features of the present invention will become apparent from the following detailed description, the accompanying drawings, and the appended claims.

BRIEF DESCRIPTION OF THE DRAWINGS

FIG. 6b is a diagram showing the locations of the through-channels corresponding to the data points in FIG. 6a;

FIG. 7a is an photograph of a palladium membrane coating deposited on the through-channels of a monolithic substrate FIG. 7b is a scanning electron microscopy (SEM) image (3,000× magnification) of a cross-section of the palladium membrane shown in FIG. 7a;

DETAILED DESCRIPTION

Figure 1:
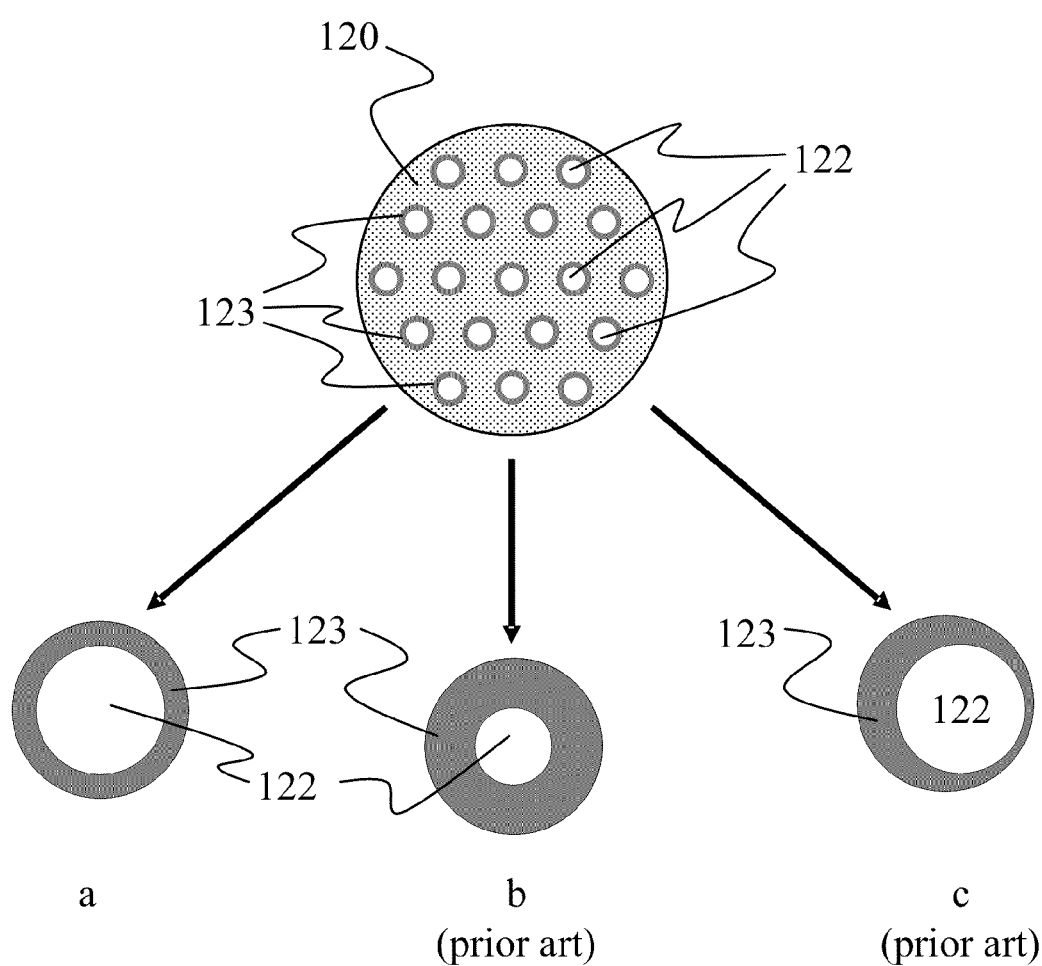
FIG. 1 is a schematic representation of cross-sectional view of a substrate having a plurality of through-channels that are coated with a membrane.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise any number of those elements recited, either individually or in combination with each other. Similarly, whenever a group is described as consisting of at least one of a group of elements and combinations thereof, it is understood that the group may consist of any number of those elements recited, either individually or in combination with each other.

Referring to the drawings in general and to FIG. 1 in particular, it will be understood that the illustrations are for the purpose of describing a particular embodiment of the invention and are not intended to limit the invention thereto. Turning to FIG. 1, a schematic representation of a cross-sectional view of a substrate 120 having a plurality of through-channels 122 that are coated with membrane 123. Some of the challenges faced in applying membrane coatings 123 to the walls of though-channels 122, particularly where each of the through-channels 122 has a diameter of up to about 3 mm, of a monolithic substrate 120 include non-uniform distribution of the membrane coating 123 throughout all of the through-channels 122, non-uniformity of the membrane coating 123 along the length of each through-channel 122, non-uniform distribution of membrane coating 123 over the cross-sectional area of each through-channels 122, difficulties in introducing viscous coating solutions into the plurality of through-channels 122, and difficulty in controlling deposition conditions such as residence time.

Problems associated with obtaining uniform membrane coatings 123 over the cross-sectional area of each through-channel 122 are schematically shown in FIG. 1. While a predetermined thickness and uniformity of membrane coating 122 is desired ((a) in FIG. 1), prior art methods of coating through-channels 122 typically yield membrane coatings of uncontrolled thickness ((b) in FIG. 1) or asymmetry of membrane coating 122 ((c) in FIG. 1).

Figure 2:
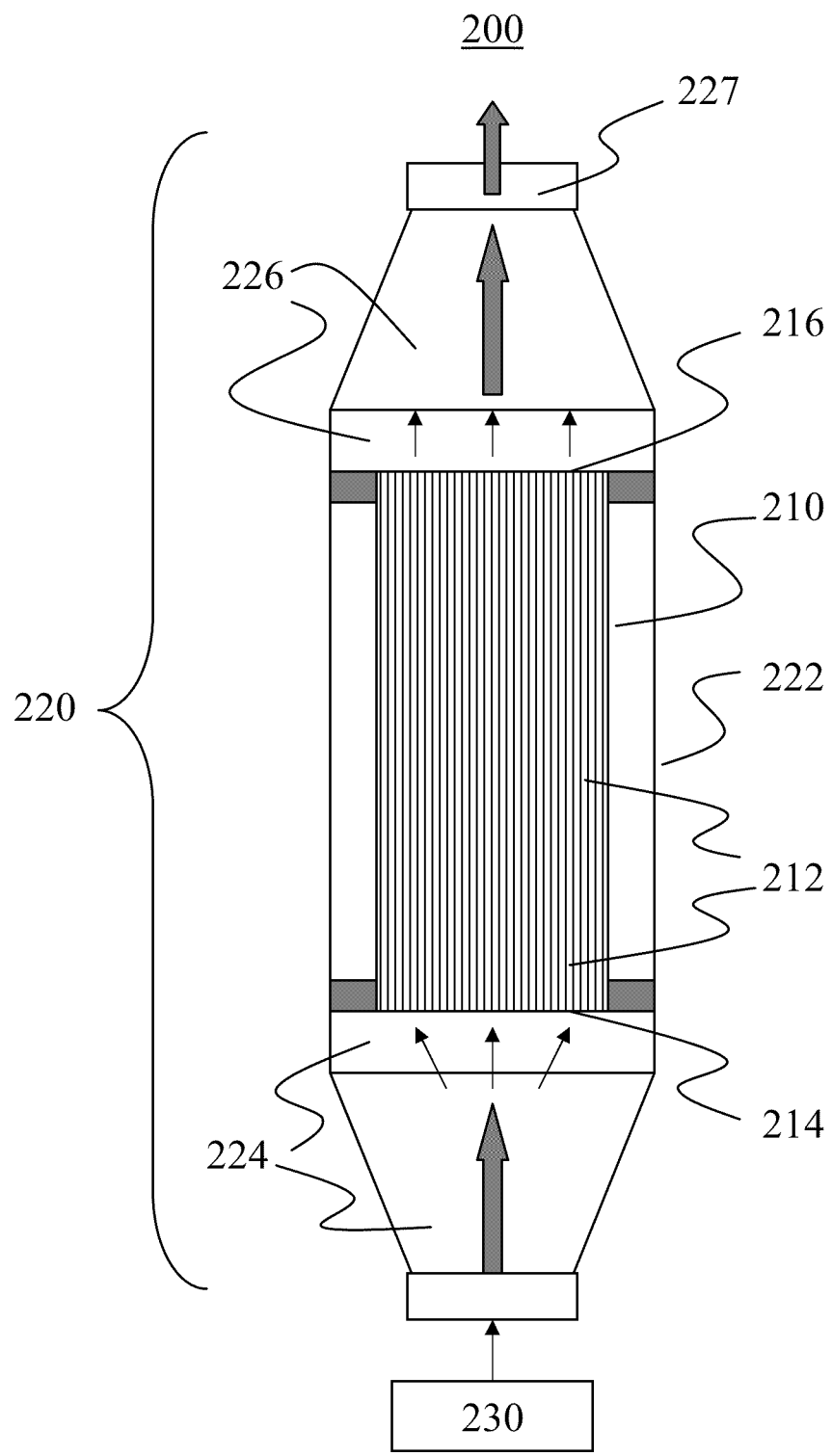
FIG. 2 is a schematic representation of an apparatus for depositing a membrane on the walls of a plurality of through-channels of a substrate.

An apparatus 200 for depositing a membrane on a substrate 210 is schematically shown in FIG. 2. Substrate 210 comprises a plurality of through-channels 212 extending from a first end 214 to a second end 216 of substrate 210. In one embodiment, each of the through-channels 212 has a diameter of less than about 3 mm and, preferably, less than about 2 mm. In another embodiment, substrate 210 is a honeycomb structure in which individual through-channels 212 have diameters in a range from about 0.5 mm up to about 2 mm. The density of through-channels 212 in substrate 210 is in a range from about 50 channels per square inch (cpsi) up to about 600 cpsi.

Apparatus 200 comprises a chamber 220 adapted to accommodate substrate 210 and maintain substrate at a predetermined pressure, a liquid precursor source 230 in fluid communication with chamber 220, and a pressurization system (not shown) coupled to chamber 220.

The pressurization system provides a pressure differential between first end 214 and second end 216 of substrate 210 through the plurality of through-channels 212. The pressurization system may comprise those means known in the art for providing positive or negative pressure in a chamber. Such means include, but are not limited to, mechanical pumps, peristaltic pumps, vacuum umps, hydraulic pressurization units, and the like. In one embodiment, the pressurization system is in fluid communication with at least one of inlet section and the outlet section.

In one embodiment, the pressure differential provided by the pressurization system is sufficient to maintain a predetermined linear flow velocity of the fluid precursor through the plurality of monolithic through-channels 212. The actual linear flow velocity depends in part upon the viscosity and composition of the liquid precursor material and the dimensions of the plurality of through-channels 212. The linear flow velocity is typically in a range from about 0.01 cm/s to about 200 cm/s. In one embodiment, the linear flow velocity is in a range from about 1 cm/s up to about 200 cm/s.

In one embodiment, the pressurization system maintains a positive pressure difference between the inlet and the outlet. The positive pressure difference is typically in a range from about 1,000 Pa up to about 1,000,000 Pa (10 bar). In one embodiment, the positive pressure difference is in a range from about 1,000 Pa up to about 200,000 Pa (2 bar). In a particular embodiment, the pressure differential is about 1,700 Pa. It will be appreciated by those skilled in the art that the pressure differential that is actually employed depends at least in part upon through-channel diameter and the viscosity of the liquid precursor. The pressure difference may be provided by maintaining a positive pressure in inlet section 224. In one non-limiting example, the pressurization system creates a pressure differential by pumping the liquid precursor in inlet section 224. Alternatively, the pressure difference may be provided by reducing pressure in outlet section 226. In this embodiment, the pressurization system may be used to generate a vacuum in outlet section 226.

The liquid precursor source 230 provides a liquid precursor to chamber 220. The liquid precursor comprises contains materials or nutrients that are necessary to form the membrane. The liquid precursor may be either a solution or a suspension or slurry of solid materials in a carrier liquid. The carrier liquid may be either water-based or organic solvent-based. The materials or ingredients of the liquid precursor may include solid particles such as, but not limited to, alumina or other ceramic materials, metals, dispersion agents, anti-cracking additives, organic templates, precursors of the membrane materials, and the like.

Chamber 220 includes a midsection 222, an inlet section 224, and an outlet section 226. Chamber 220 may be formed from glass, steel, or any other material that is capable of supporting substrate 210 and maintaining a pressure differential between first end 214 and second end 216 of substrate 210. Midsection 222 is adapted to support substrate 210 during deposition of the membrane and provide a fluid seal around the outer perimeter of substrate 210 such that inlet section 224 and outlet section 226 are in substantial fluid communication only through the plurality of through-channels 212 in substrate 210 and the pressure differential is present across the plurality of through-channels 212. Midsection 222 has an aspect ratio (ratio of length to diameter) that is greater than 1.

Inlet section 224 is adjacent to the end of midsection 222 that is in contact with first end 214 of substrate 210. Furthermore, inlet section 224 is in fluid communication with the liquid precursor source 230 and first end 214 of substrate 210. Inlet section 224 serves as a distribution section in which the liquid precursor is distributed uniformly over the cross-section of first end 214 of substrate 210, thereby enabling the liquid precursor to flow through each of the plurality of monolithic through-channels 212 at nearly identical rates. To accomplish this, inlet section may include at least one of an open space, a plenum, baffles, a packed bed of particles or beads, or other means known in the art for uniformly distributing a fluid in a chamber or space.

Outlet section 226 is adjacent to the end of midsection 222 that is in contact with second end 216 of substrate 210. Outlet section 226 is also adjacent to and in fluid communication with second end 216 of substrate 210. Outlet section 226 provides uniform discharge of fluid as it exits from the plurality of through-channels 212 at second end 216 of substrate 210. Uniform discharge of fluid from substrate 210 may be provided by an open space between substrate 210 and discharge outlet 227, or by tapering the region between substrate 210 and discharge outlet 227. Outlet section 226 also provides for removal of the fluid from chamber 220 through discharge outlet 227.

There is no limitation as to how chamber 220 may be oriented. In a preferred embodiment, shown in FIG. 2, chamber 220 is oriented vertically such that inlet section 224 is located at the bottom of chamber 220 below midsection 222 and outlet section is located at the top of the chamber 220 and above midsection 222. This particular orientation facilitates even deposition of a coating—and subsequent membrane formation—on the walls of the plurality of through-channels 212.

Apparatus 200 may further comprise a heat source for maintaining chamber 220 and substrate 210 at a predetermined temperature. The heat source may include microwave heaters, liquid heat exchangers, or a resistively heated heat source, such as, but not limited to, heating tapes or mantels, furnaces, and the like. The heat source is capable of heating chamber 120 and substrate up to a temperature of about 500° C.

Figure 3:
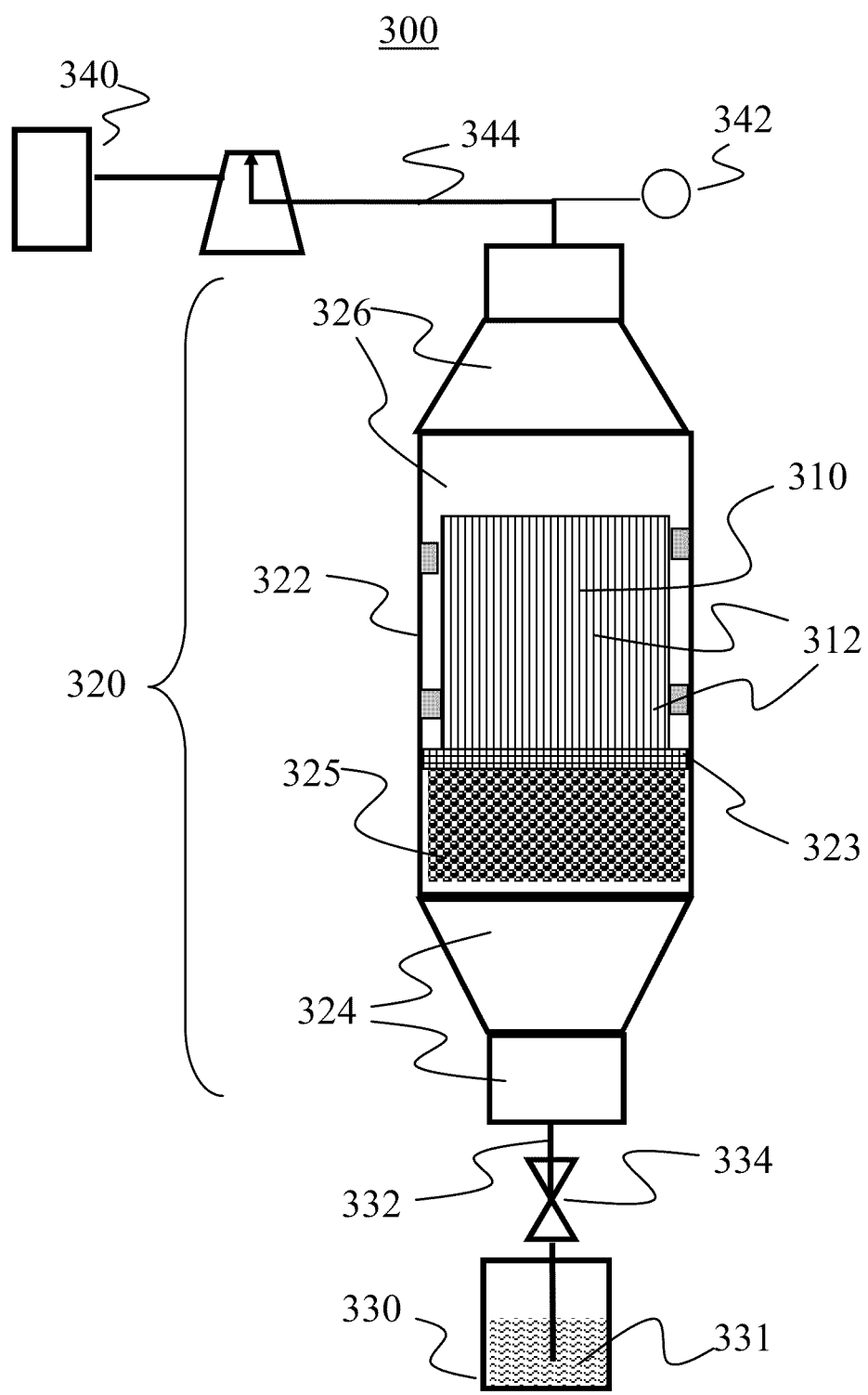
FIG. 3 is a schematic representation of one embodiment of an apparatus for depositing a membrane on the walls of a plurality of through-channels of a substrate.

Another embodiment of apparatus 200 is shown in FIG. 3. Apparatus 300 is adapted to deposit a membrane on the walls of the plurality of through-channels 312 in substrate 310 using a physical deposition process. Such a process may be used to deposit, for example, a membrane comprising a ceramic, such as alumina or the like. A suction tube 332 connects a liquid precursor source 330 to chamber 320. Liquid precursor source 330 contains a liquid precursor, which, in one embodiment, may comprise a water-based solution, ceramic particles, a dispersant, and a polymeric anti-cracking agent. The interior of chamber 320 is pulled to a vacuum using a vacuum pump 340. The vacuum is monitored using a vacuum gauge 342, which is in fluid communication with vacuum/exit line 344, which connects vacuum pump 340 to outlet section 326 of chamber 320. In one embodiment, vacuum pump 340 is a water vacuum pump or aspirator, which creates a vacuum of about 5 mm Hg. Control valve 334 is used to control the flow rate of the liquid precursor into inlet section 324. A portion of inlet section 324 is packed with a bed 325 of beads to facilitate uniform distribution of the liquid precursor over the cross-section of first end 314 of substrate 310, thereby enabling the liquid precursor to flow through each of the plurality of monolithic through-channels 312 at nearly identical rates. In one embodiment, bed 325 has a depth of about 2 inches (about 5 cm) and comprises alumina or glass beads, each having a diameter of about 1 mm. A flat stainless steel mesh 323 supports substrate 310 in midsection 322 above bed 325.

Figure 4:
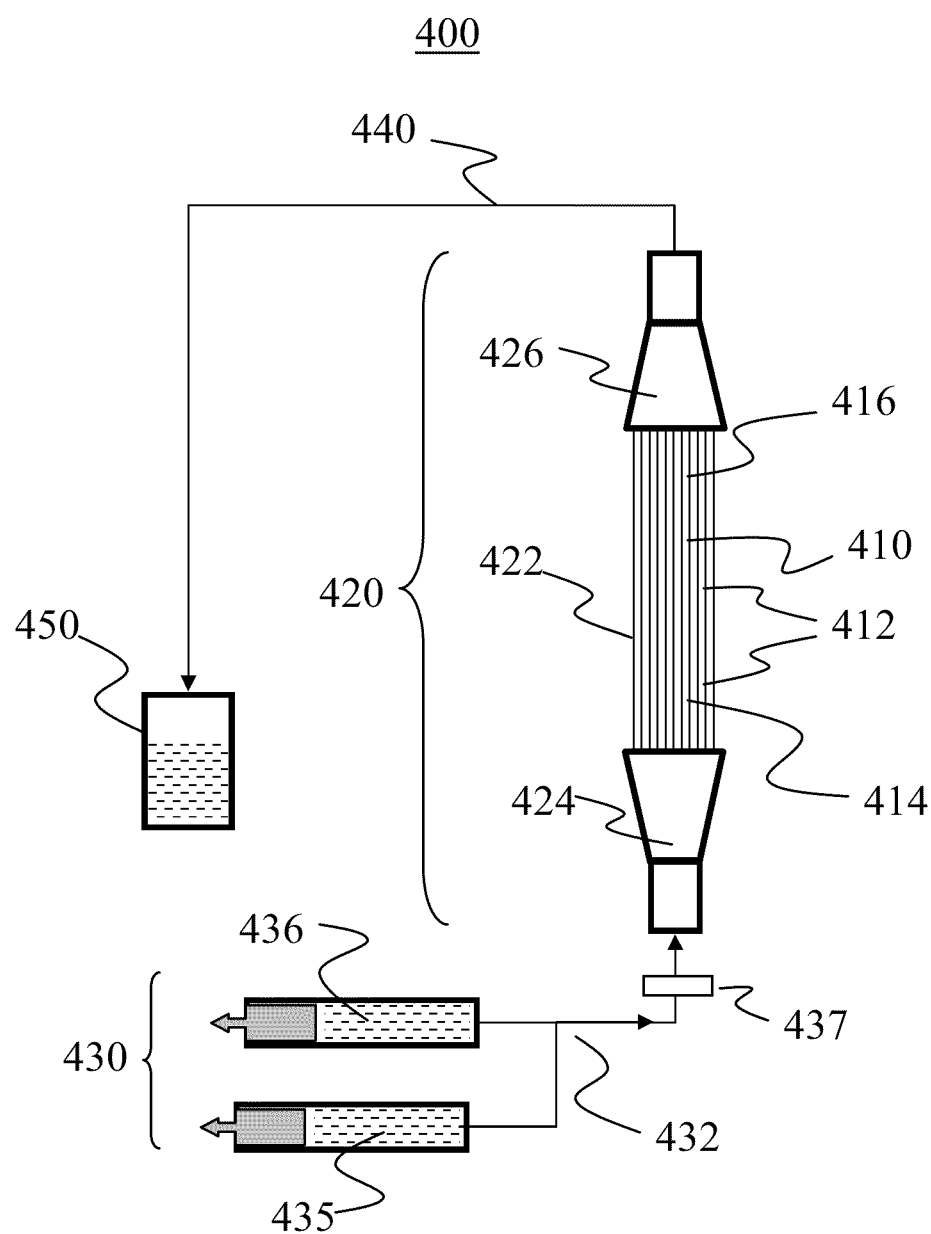
FIG. 4 is a schematic representation of another embodiment of an apparatus for depositing a membrane on the walls of a plurality of through-channels of a substrate.

Another embodiment of apparatus 200 is shown in FIG. 4. Apparatus 400 is adapted to deposit a membrane on the walls of the plurality of through-channels 412 in substrate 410 using a chemical deposition process such as, for example, electroless plating or hydrothermal synthesis. Such processes may be used, for example, to deposit a membrane comprising a metal, such as palladium or the like, or ceramics, such as zeolite. In this embodiment, substrate 410 serves as midsection 422 of apparatus 400. Liquid precursor source 430 includes two separate chambers 435 and 436, which hold reactive membrane-forming materials. The liquid precursors are pumped from chambers 435 and 436 through liquid feed line 432 into an optional mixing chamber 437 where the liquid precursors intermix. Inlet section 424 includes an open space that allows the reactive membrane-forming materials to be uniformly distributed to all of the plurality of through-channels 422 in substrate 420. The liquid precursors flow upward through the plurality of through-channels 422, where the reactive membrane-forming materials combine to deposit the membrane (or a pre-membrane coating) on the walls of the plurality of through-channels 422. The now depleted liquid precursors exit the plurality of through-channels 422 of substrates 420 to outlet section 426, and are discharged into a tank 450.

A chamber for depositing a membrane on a substrate having a plurality of through-channels, as previously described herein, is also provided.

The invention also provides a method of forming a membrane in a plurality of through-channels disposed in a substrate. A substrate is first provided to a chamber. The substrate, as previously described, has a first end, a second end, and a plurality of through-channels extending through the substrate from the first end to the second end. Each of the through-channels has a diameter of less than about 2 mm. The chamber, as previously described, has an inlet section, a midsection, and an outlet section. The substrate is disposed in the midsection of the chamber such that the first end is adjacent to and in fluid communication with the inlet section and the second end is adjacent to and in fluid communication with the outlet section of the chamber.

In a second step, a liquid precursor comprising membrane-forming materials is provided to the inlet section of the chamber. The liquid precursor may be either a solution or a suspension or slurry of solid materials in a liquid.

A pressure differential is then provided between the inlet section and the outlet section. The pressure differential causes the liquid precursor to flow uniformly through the plurality of through-channels. In one embodiment, a positive pressure difference between the inlet section and the outlet section is provided. The positive pressure difference is typically in a range from about 1,000 Pa up to about 1,000,000 Pa (10 bar). In one embodiment, the positive pressure difference is in a range from about 1,000 Pa up to about 200,000 Pa (2 bar). In a particular embodiment, the pressure differential is about 1,700 Pa. The pressure difference may be provided by maintaining a positive pressure in the inlet section while the outlet section is at ambient pressure. Alternatively, the pressure differential may be provided by reducing pressure in the outlet section. In this embodiment, the pressure differential is provided by generating a vacuum in the outlet section.

In a fourth step, a membrane is formed on the surfaces of the plurality of through-channels. Membrane deposition or formation is carried out using physical methods, chemical methods, or combinations of both physical and chemical deposition methods.

In one embodiment, the fourth step of forming the membrane comprises forming the membrane using physical deposition. Here, the liquid precursor is a suspension, slip, or slurry that comprises a plurality of solid particles and a carrier liquid. The solid particles comprise membrane-forming materials. The plurality of solid particles are transported by the carrier liquid to the surface of the walls of at least a portion of the plurality of through-channels. The membrane-forming materials are deposited on the surface of the walls, leaving an intact deposition layer after the carrier liquid is discharged. The substrate may then be removed from the chamber and the deposition layer subsequently dried and fired to form the membrane. One example of such a physical deposition process is described in United States Provisional patent application filed Feb. 27, 2007, by Zhen P. Song et al., entitled "Inorganic Membranes and Method of Making," the contents of which are incorporated herein by reference in their entirety.

In another embodiment, the fourth step of forming the membrane includes forming the membrane using chemical deposition. Here, the liquid precursor comprises membrane-forming materials that react with each other or with the substrate to form the membrane. The membrane-forming materials are transported from the liquid precursor onto the walls of the plurality of through-channels, where the membrane-forming materials undergo chemical reactions on the channel wall to form a membrane layer. The membrane-forming constituents may react with the wall or with each other. Non-limiting example of such chemical deposition include electroless plating and hydrothermal synthesis.

In a third embodiment, the fourth step of forming the membrane comprises a method that combines physical and chemical deposition methods so as to form the membrane. A portion of the membrane-forming materials are first deposited on the support/substrate surface to form a pre-coating. The membrane is then synthesized by reacting membrane-forming materials in the liquid precursor with the pre-coating.

The thickness, texture, and uniformity of the deposited membrane films may be controlled by process conditions. It will be apparent to one of ordinary skill in the art that the process conditions that are actually employed in the deposition or synthesis of such membrane films depend on the nature of the membrane film and the liquid precursor, as well as other variables. For example, the linear velocity of the liquid precursor through the plurality of through-channels affects the hydrodynamics and mass transport of the liquid precursor onto the walls of the plurality of through-channels. In one embodiment, the liquid precursor flows through the plurality of through-channels at a predetermined linear velocity. The predetermined velocity, in one particular embodiment, is in a range from about 1 cm/s up to about 10 m/s.

As used herein, "residence time" is the time required for a fluid traveling through the plurality of through-channels to traverse the substrate—i.e., the time between entry and exit of the liquid precursor in the substrate. The residence time is defined as the ratio of the length of the substrate (or the average length of the plurality of through-channels) to the linear velocity. The residence time, in one embodiment, is in a range from about 1 second up to about 1 hour.

"Duration time" is the time that the surface of the plurality of through-channels is exposed to the liquid precursor. Coating duration time relies on deposition kinetics and determines the time needed for membrane deposition or synthesis to occur. The coating duration time may be in a range from about 5 seconds up to a few weeks, and is preferably longer than the residence time in order to obtain a uniform membrane.

The temperature at which membrane deposition or synthesis occurs in a range from about room temperature (about 20° C.) up to about 500° C.

The following examples illustrate the features and advantages of the invention and are in no way intended to limit the invention thereto.

Example 1

Physical Deposition of Porous α-Alumina Membrane onto Monolithic Channels

Unless otherwise specified, monolithic substrate (also referred to herein as "monolithic supports") made of α-alumina, each having an outer diameter ranging from 8.7 mm to 9.2 mm and a length of about 150 mm, were used in this example. Each monolithic support had 19 through-channels uniformly distributed over the cross-sectional area of the monolithic support. The average diameter of the through-channels was 0.75 mm.

The monolithic support was mounted into the apparatus shown in FIG. 3, described hereinabove. A water-based coating solution 331 containing α-alumina particles, a dispersant, and a polymeric anti-cracking agent was used as the liquid precursor. The coating solution 331 was placed inside a beaker 330. The top of beaker 330 was open to air, and the contents of beaker 330 were exposed to atmospheric pressure.

A suction tube 332 was immersed in coating solution 331 and connected to the rest of apparatus 300, and water vacuum faucet 340 was used to pull a vacuum of about 5 mm Hg in apparatus 300. Control valve 334 was used to control the flow of coating solution 331 into chamber 320 such that coating solution 331 flowed into monolithic support 320 gradually over a few seconds.

Monolithic support 320 was soaked in coating solution 331 for about 20 seconds, during which time monolithic support 320 was fully immersed in coating solution 331. Monolithic support 320 was then removed from apparatus 300. Excess coating solution 331 in the plurality of through-channels 322 was removed by spinning monolithic support 320 at 525 rpm, leaving behind a coating on the walls of through-channels 322. Monolithic support 320 was then dried at 120° C. The dried monolithic support 320 was heated up to 1200° C. at a rate of 1° C./mim, heated at 120° C. for 30 minutes, and fired at about 1225° C. for five minutes to form the membrane coating in the plurality of through-channels 322.

Figure 5:
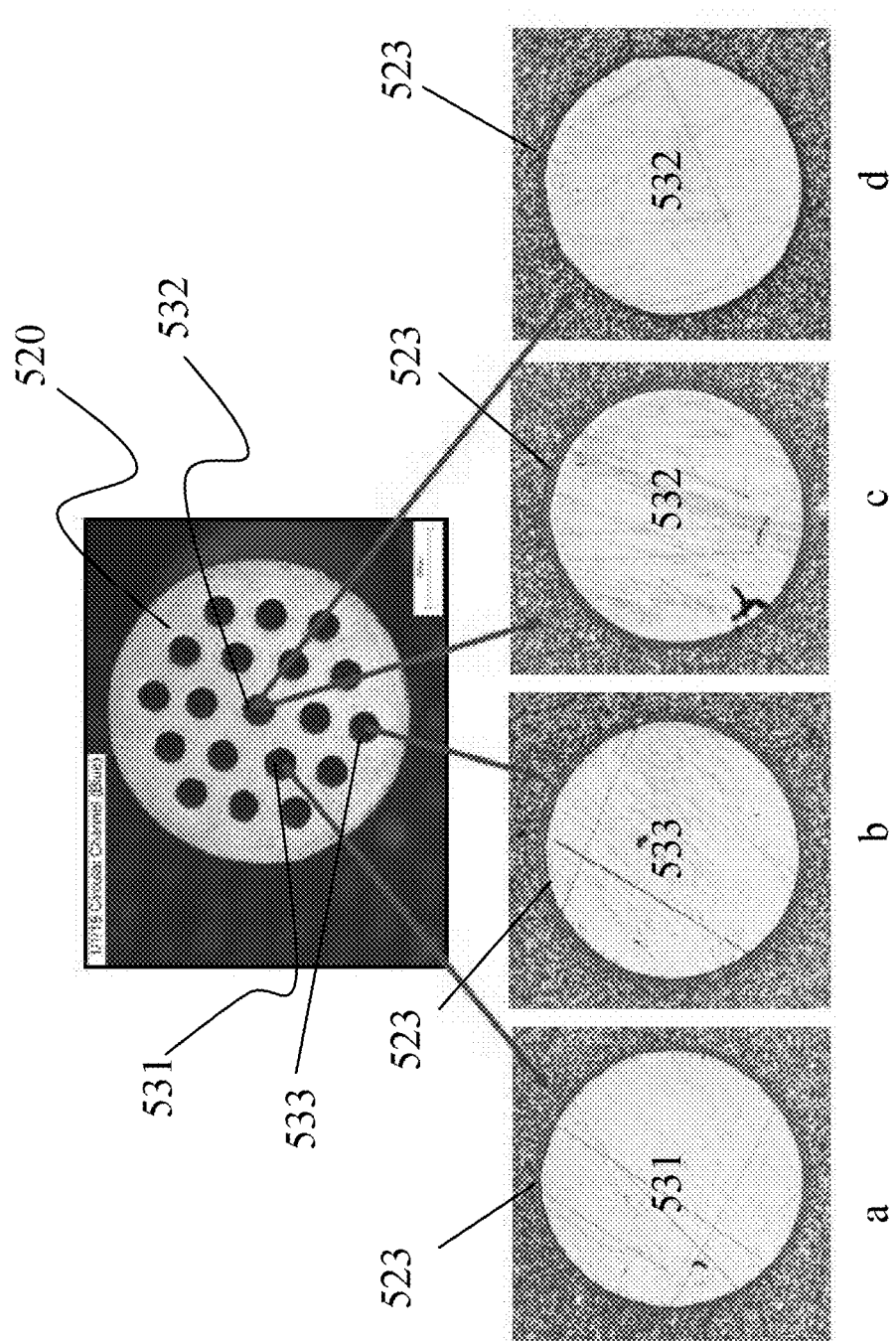
FIG. 5 shows optical microscopy images (4× magnification) of cross sections of α-alumina membrane coatings deposited on the walls of 0.75 mm diameter through-channels in a monolithic support.

The cross-sections of the deposited α-alumina membranes were characterized according to the radial position of the through-channels in the monolithic support and longitudinal position (i.e., along the length of the through-channels). Longitudinal samples labeled as being obtained at the "top," "middle," and "bottom" of a through-channel were collected within 1 cm of the top end of the through-channel, at the geometric middle of the through-channel, and within 1 cm of the bottom end of the through-channel, respectively. FIG. 5 shows optical microscopy images of cross-sections of the α-alumina membrane coatings 523 obtained along the length of monolithic support 520. Image (a) in FIG. 5 shows a cross-section of membrane coating 523 deposited on the middle section (longitudinally) of inner through-channel 531. Image (b) shows a cross-section of membrane coating 523 deposited on the middle section of outer through-channel 533. Images (c) and (d) show a cross-sections of membrane 523 deposited on the top section and bottom sections of center through-channel 532, respectively.

Figure 6A:
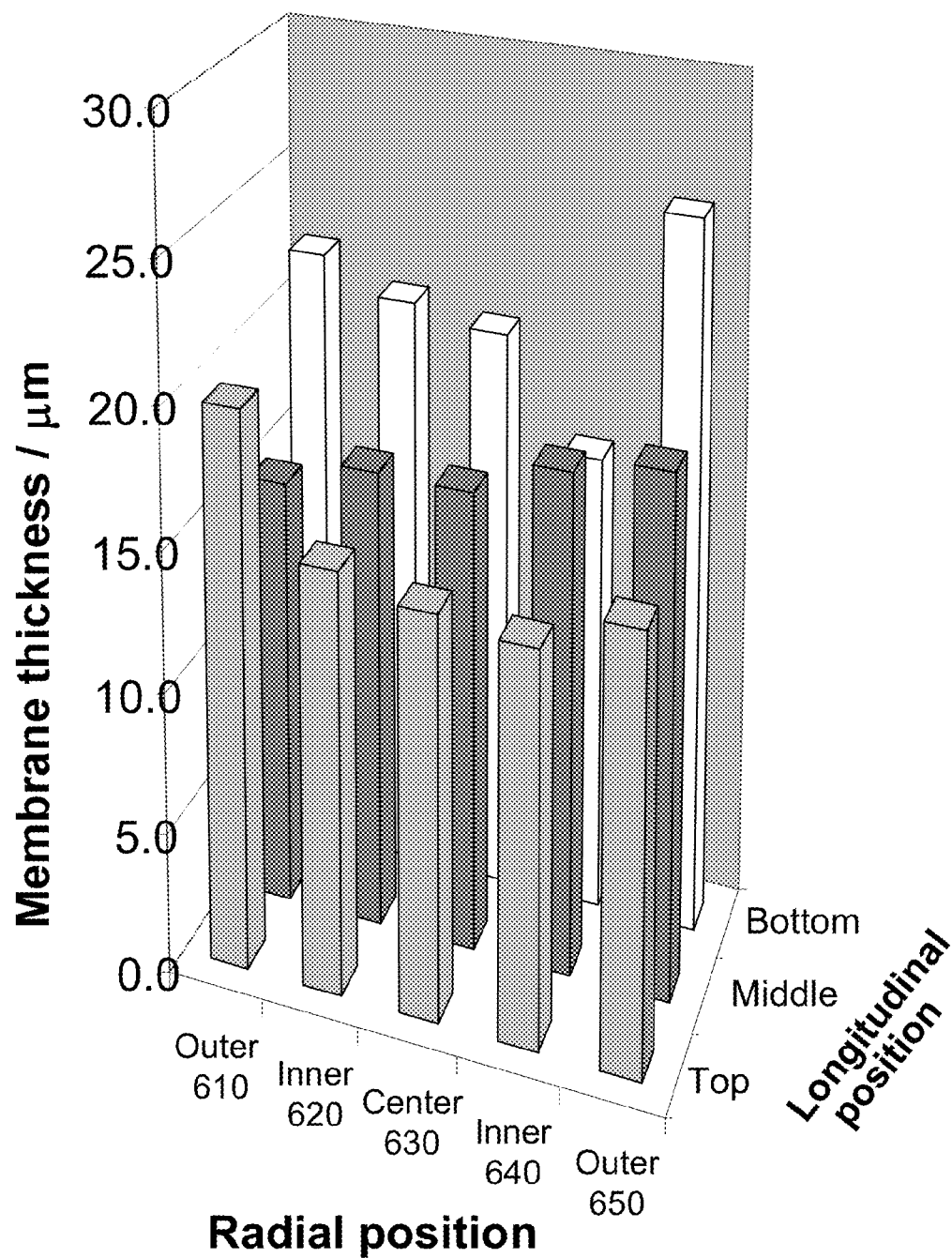
FIG. 6a is a plot of membrane coating thickness as a function of radial and longitudinal location.
Figure 6B:
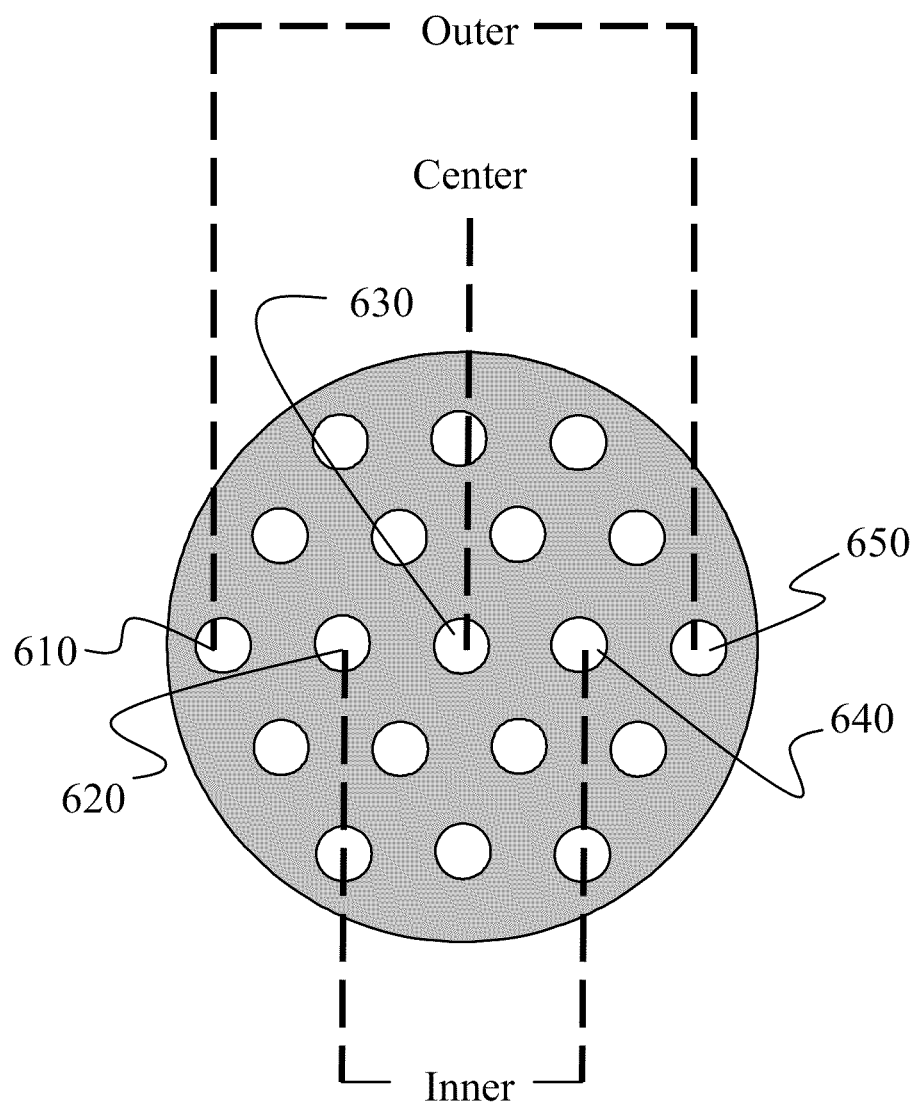

The thicknesses of the membrane coatings 523 shown in FIG. 5 are plotted as a function of radial and longitudinal locations in FIG. 6a. The locations of the through-channels corresponding to the data points in FIG. 6a are shown in FIG. 6b. The thicknesses of membrane coating 523 deposited using the method and apparatus described herein are generally uniform in both the radial and longitudinal directions. For example, the thickness of the membrane ranges from about 19 μm (outer through-channel 610) to about 14 μm (inner through-channel 640) at the top of the through-channels; from about 14 μm (outer through-channel 610) to about 16 μm (outer through-channel 650) at the middle of the through-channels; and from about 16 μm (inner through-channel 640) to about 25 μm (outer through-channel 650). The membrane deposited in outer through-channel 615 has the greatest variation of thickness, ranging from 25 μm at the bottom of the through-channel to about 14 μm at the top of the through-channel.

Example 2

Microfiltration of Deposited α-Alumina Membrane

Two sets of membranes formed in the manner described in Example 1 were used to test the filtration of skim milk/water mixtures. One set of membranes was formed using a coating solution comprising 4 vol % α-alumina (Sample 2A), and a second set of membranes was formed using a coating solution comprising 6 vol % α-alumina (Sample 2B). The microfiltration performance of the α-alumina membranes is shown in Table 1.

Less than 0.1% of the protein particles in the skim milk/water mixture had a size of less than 0.068 μm, whereas 99.9% of the protein particles had a size of less than 0.409 μm, as measured by a Nanotrac™ light scattering size analyzer.

The filtration function of a membrane is gauged by the turbidity number (NTU) of the membrane. NTU is a measure of the amount of particulate passes through a membrane. A NTU value of less than 12 is considered acceptable for commercially available 200 nm membranes.

Both sets of membrane coatings exhibited similar microfiltration performance. The filtration function of the membranes prepared in this example is shown by the rejection of 98-99% of the protein particles, with only two of seven samples having NTU values slightly greater than 12. The results indicate that the membranes prepared in this example herein performed as expected and at a level comparable to commercially available membranes.

TABLE 1

Microfiltration performance of α-alumina membranes with skim milk/water mixture.

| | Sample 2A | | | |
| | 2 × 4 vol % coating | | | |
| --- | --- | --- | --- | --- |
| Operating pressure (psi) | 24 | 24 | 24 | 32 |
| Sampling time (min) | 13.0 | 19.0 | 26.0 | 34.0 |
| Permeation rate (ml/min) | 4.3 | 3.8 | 3.4 | 4.4 |
| Permeance (L/m$^2$/h/bar) | 88.7 | 78.0 | 71.3 | 68.6 |
| Reduction of turbidity (%) | 98.5 | 98.3 | 98.2 | 99.0 |
| NTU (turbidity no.) of permeate | 10.1 | 11.8 | 12.2 | 6.5 |
| | Sample 2B | | | |
| | 2 × 6 vol % coating | | | |
| Operating pressure (psi) | 24.0 | 24.0 | 24.0 | |
| Sampling time (min) | 8.0 | 16.0 | 24.0 | |
| Permeation rate (ml/min) | 3.2 | 2.9 | 2.8 | |
| Permeance (L/m$^2$/h/bar) | 68.9 | 63.1 | 60.5 | |
| Reduction of turbidity (%) | 98.3 | 99.1 | 99.5 | |
| NTU (turbidity no.) of permeate | 12.5 | 6.8 | 4.0 | |

Example 3a

Electroless Deposition of Pd Thin Film Membrane Using Method and Apparatus Described Herein This example illustrates the chemical deposition of a membrane film using the method and apparatus described herein.

Palladium and palladium alloys with copper or silver are well known as membrane materials for hydrogen separation. These membranes have both high flux and high selectivity to hydrogen permeation at temperatures above 250° C.

An electroless plating technique was used in the instant method to deposit palladium membrane coatings on monolithic supports. The liquid precursor or coating solution comprised aqueous-based precursors. For the electroless plating of palladium, the aqueous-based precursors included: $PdCl_2$ (0.04 M); $Na_2EDTA \cdot 2H_2O$ (0.2 M), $NH_3 \cdot H_2O$ (25 wt. %) (600 ml/L), and $N_2H_4 \cdot H_2O$ (80 wt. %) (1.2 ml/L). The palladium membrane was synthesized by the following chemical reaction on the support surface:

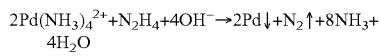

Deposition of palladium was carried out on monolithic supports comprising γ-alumina. While the monolithic supports used in these examples comprised γ-alumina, it is understood that the electroless deposition process could be used to deposit palladium on other monolithic supports that have at least one γ-alumina coating layer. An α-alumina support could, for example, be coated with an α-alumina membrane that is in turn coated with a γ-alumina film for the deposition of a Pd membrane.

Each monolithic support had an outer diameter of 9.5 mm and a length of 50 mm. Each monolithic support had 19 through-channels that were uniformly distributed over the cross-sectional area of the support. The through-channels had an average diameter of 1.0 mm.

The electroless plating process was carried out using the method described herein and the apparatus shown in FIG. 4. The monolithic support 410, 50 mm in length, was placed vertically in chamber 420. Plating solutions 433, 436 were pumped from liquid precursor source 430 through feed line 432 into inlet section 424, and flowed upward through monolith 410. To allow plating solutions 433, 436 to be uniformly distributed to all through-channels 412, some open space was left in inlet section 424 between the inlet from liquid precursor source 430 and first end 414 of monolith 410. Plating solutions 433, 436 were then discharged from chamber 420 into tank 450 through line 440. The flow rate was controlled, and was 60 cc/h. The residence time of the plating solutions in chamber 420 was about two minutes. The overall duration time for plating was controlled, and limited to one hour.

Example 3b

Electroless Plating Deposition of Pd Thin Film Membrane Using Conventional Method (Comparative Example)

For comparison, electroless plating was carried out using the conventional technique. Here a second γ-alumina monolithic support was immersed in a beaker containing a plating solution having the same composition as plating solutions 433, 436.

Electroless plating using the conventional technique resulted in plating only the exterior walls of the monolithic support with palladium.

Figure 7:
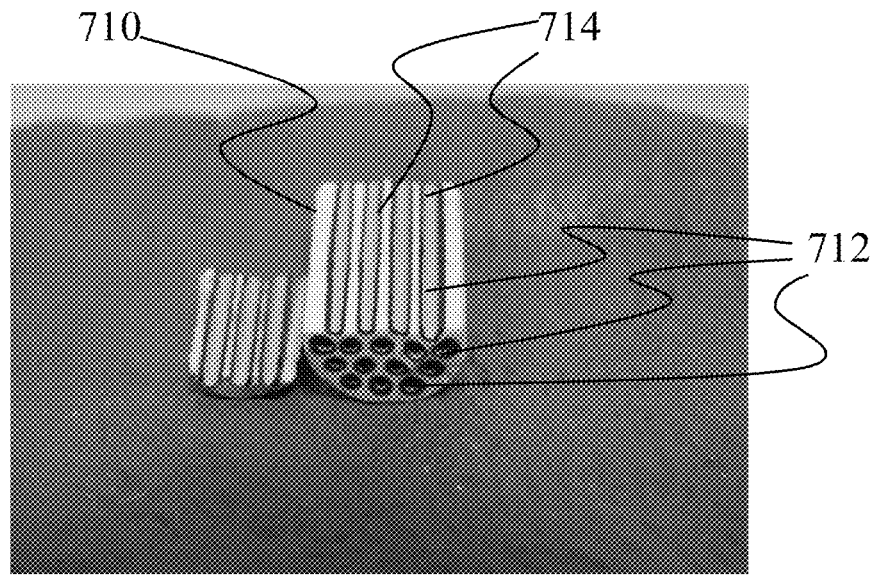
Figure 7:
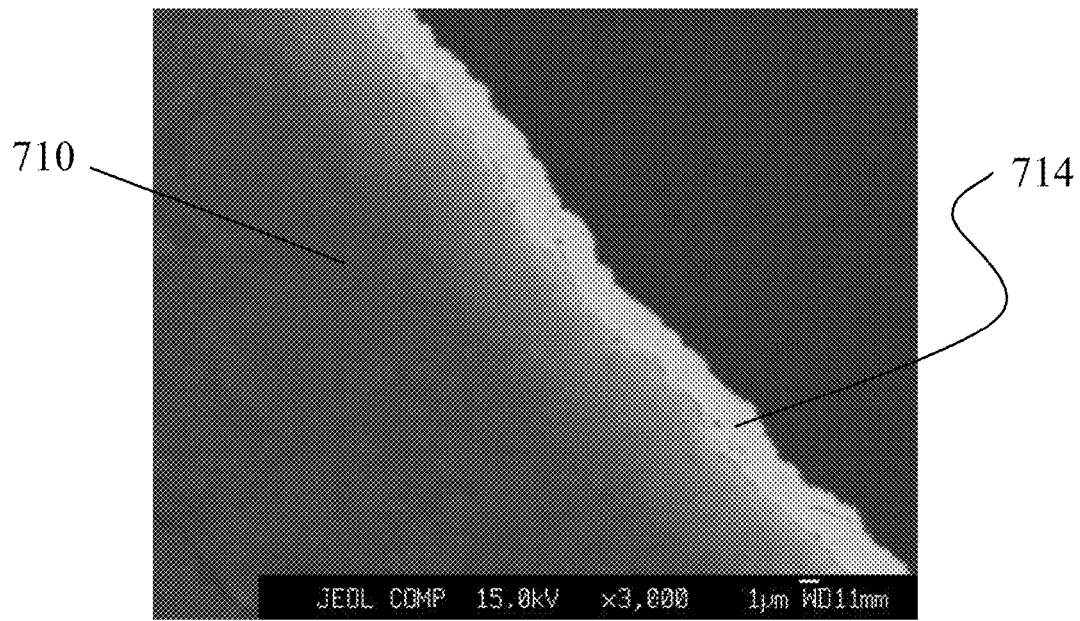

In contrast to the conventional technique, the flow coating process using the method and apparatus of the present invention resulted in the uniform coating of all through-channels with palladium. Optical and SEM images of the palladium membrane coating 714 deposited using the instant method on the through-channels 712 of monolithic support 710 are shown in FIGS. 7a and 7b, respectively. In FIG. 7a, a portion of monolithic support 710 is cut away to reveal the Pd membrane coating 714 deposited along the length of through-channels 712. The thickness of Pd membrane coating 714 is about 2 to 3 μm.

Figure 8:
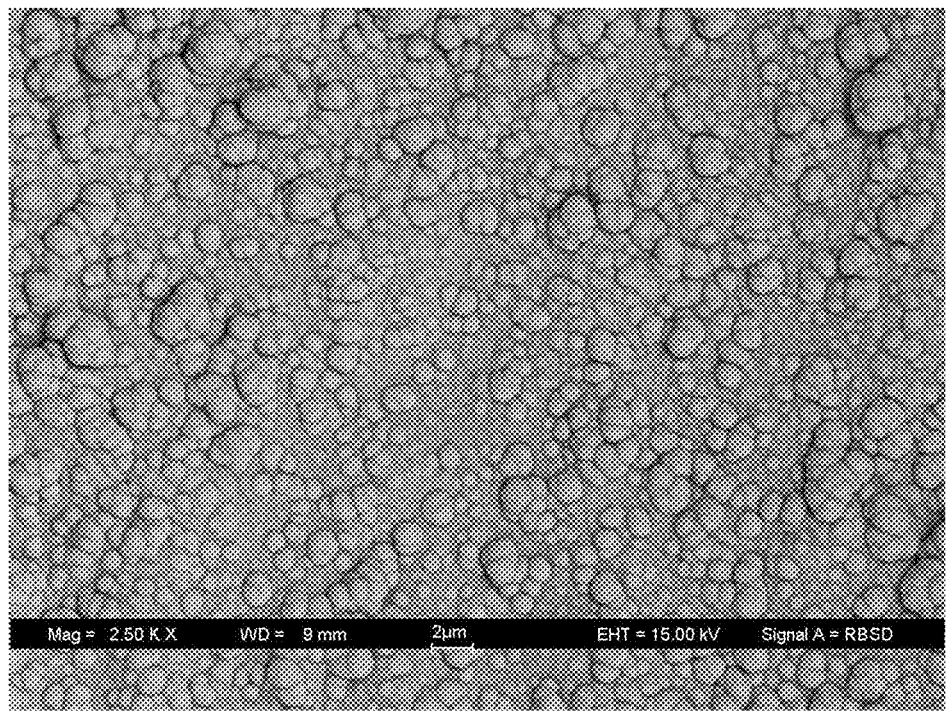
FIG. 8a is an SEM image (2,500× magnification) of the as-plated surface texture of the palladium membrane shown in FIGS. 7a and 7b.
FIG. 8b is an SEM image (5,000× magnification) of the surface texture of the palladium membrane shown in FIGS. 7a and 7b after annealing at 450° C. for two days.
Figure 8:
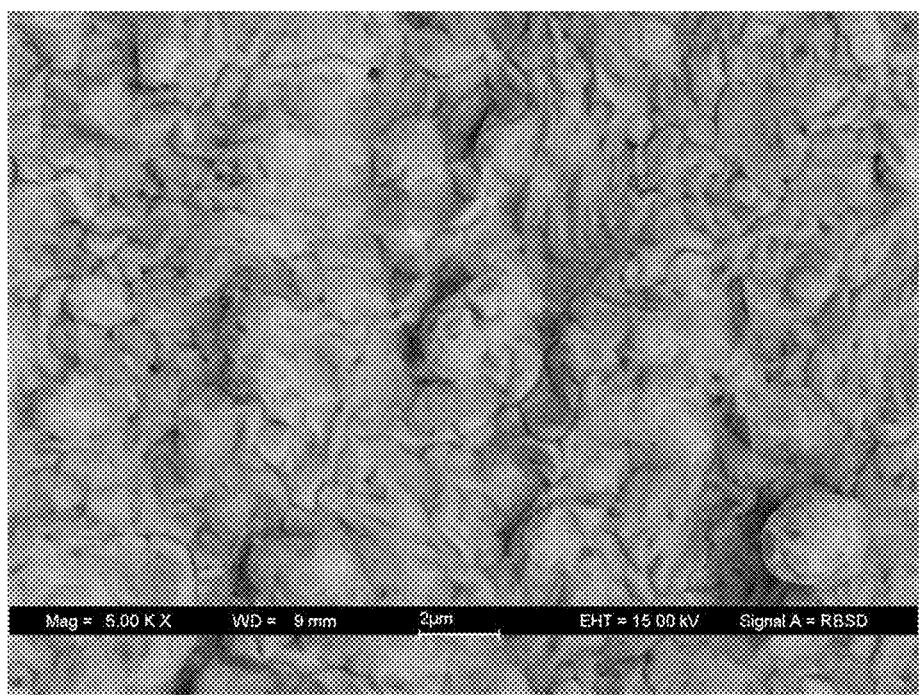

The monolithic substrate having the Pd membrane coating was subsequently annealed for two days at 450° C. SEM images of the palladium membrane surface texture as-plated and after annealing are shown in FIGS. 8a and 8b, respectively. As seen in FIG. 8b, the palladium membrane formed a dense film as a result of annealing. A thin dense membrane such as that shown in FIG. 8b is known to provide both high flux and selectivity, and is therefore preferred in hydrogen separation applications.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of forming a membrane in a plurality of through-channels disposed in a substrate, the method comprising the steps of:
   a. providing the substrate to a chamber, the substrate having a first end, a second end, and a plurality of through-channels extending through the substrate from the first end to the second end, wherein the chamber has an inlet section below the substrate, a midsection supporting the substrate and separating the substrate from the inlet section, and an outlet section, wherein the substrate is disposed in the midsection such that the first end is, adjacent to and in fluid communication with the inlet section and the second end is adjacent to and in fluid communication with the outlet section, wherein the chamber is oriented vertically such that the inlet section is located at the bottom of the chamber below the midsection and the outlet section is located at the top of the chamber above the midsection;
   b. providing a liquid precursor to the inlet section, wherein the liquid precursor comprises membrane-forming materials;
   c. providing a pressure differential between the inlet section and the outlet section, wherein the pressure differential causes the liquid precursor to flow uniformly through the plurality of through-channels; and
   d. forming the membrane on a surface of the plurality of channels.

2. The method according to claim 1, wherein the liquid precursor comprises a plurality of solid particles, and wherein the step of forming the membrane on a surface of the plurality of channels comprises:
   a. transporting the plurality of solid particles in the precursor liquid to the surface of at least a portion of the plurality of through-channels; and
   b. depositing the plurality of solid particles on the surface to form the membrane.

3. The method according to claim 1, wherein the step of forming the membrane on a surface of the plurality of through-channels comprises:
   a. transporting the liquid precursor to the surface of at least a portion of the plurality of through-channels; and
   b. reacting the membrane-forming materials with the surface or each other to form the membrane.

4. The method according to claim 1, wherein the liquid precursor flows through the plurality of through-channels at a predetermined linear velocity.

5. The method according to claim 4, wherein the predetermined linear velocity is in a range from about 0.01 cm/s to about 200 cm/s.

6. The method according to claim 5, wherein the linear flow velocity is in a range from about 1 cm/s up to about 200 cm/s.

7. The method according to claim 1, wherein the step of providing the pressure differential between the inlet section and the outlet section comprises providing a pressure differential between the inlet section and the outlet section in a range from about 1,000 Pa up to about 1,000,000 Pa.

8. The method according to claim 1, wherein each of the through-channels has a diameter of less than about 3 mm.

* * * * *